(12) United States Patent
Obee et al.

(10) Patent No.: US 9,308,492 B2
(45) Date of Patent: Apr. 12, 2016

(54) METHOD AND SYSTEM FOR USING AN OZONE GENERATING DEVICE FOR AIR PURIFICATION

(75) Inventors: Timothy N. Obee, South Windsor, CT (US); Stephen O. Hay, Tolland, CT (US); Susan D. Brandes, South Windsor, CT (US); Leland G. Brandes, legal representative, South Windsor, CT (US); Meredith B. Colket, Simsbury, CT (US)

(73) Assignee: CARRIER CORPORATION, Farmington, CT (US)

( * ) Notice: Subject to any disclaimer, the term of this patent is extended or adjusted under 35 U.S.C. 154(b) by 923 days.

(21) Appl. No.: 12/663,759

(22) PCT Filed: Jun. 22, 2007

(86) PCT No.: PCT/US2007/014536
§ 371 (c)(1),
(2), (4) Date: Dec. 9, 2009

(87) PCT Pub. No.: WO2009/002294
PCT Pub. Date: Dec. 31, 2008

(65) Prior Publication Data
US 2010/0172793 A1 Jul. 8, 2010

(51) Int. Cl.
*B01D 53/32* (2006.01)
*B01D 53/34* (2006.01)
*B01D 53/38* (2006.01)

(52) U.S. Cl.
CPC .............. *B01D 53/32* (2013.01); *B01D 53/346* (2013.01); *B01D 53/38* (2013.01); *B01D 2251/104* (2013.01); *B01D 2257/708* (2013.01); *B01D 2259/818* (2013.01)

(58) Field of Classification Search
CPC ....... B01D 53/32; B01D 53/346; B01D 53/38
USPC ................... 422/120, 121, 122, 123
See application file for complete search history.

(56) References Cited

U.S. PATENT DOCUMENTS 4,156,653 A * 5/1979 McKnight ................ 422/186.09
4,990,311 A    2/1991 Hirai et al.
(Continued)

FOREIGN PATENT DOCUMENTS

DE    10134707 A1    2/2003
EP    0825693 A2    2/1998
(Continued)

OTHER PUBLICATIONS

English translation of JP 11206316.*
(Continued)

*Primary Examiner* — Regina M Yoo
(74) *Attorney, Agent, or Firm* — Cantor Colburn LLP

(57) ABSTRACT

An air purification system for a heating, ventilation, and air conditioning (HVAC) system includes an ozone generating device that is used to introduce ozone into an air stream flowing through the ozone generating device. The ozone is used to remove contaminants, including volatile organic compounds (VOCs), from the air stream. The purification system includes sensors in various locations within the HVAC system to measure a concentration of constituents in the air. In some embodiments, the constituents may include ozone and VOCs, such as toluene, butene, and propanal. To control an amount of ozone generated, the purification system controls an amount of electrical power to the ozone generating device. To control a concentration of ozone generated, the purification system controls a flow rate of air through the ozone generating device.

9 Claims, 12 Drawing Sheets

(56) References Cited

U.S. PATENT DOCUMENTS

| | | | |
|---|---|---|---|
| 5,502,346 A | 3/1996 | Hsieh | |
| 5,518,698 A * | 5/1996 | Karlson et al. | 422/186.18 |
| 5,547,644 A * | 8/1996 | Taylor et al. | 422/186.18 |
| 5,573,730 A * | 11/1996 | Gillum | 422/123 |
| 5,872,426 A | 2/1999 | Kunhardt et al. | |
| 6,005,349 A | 12/1999 | Kunhardt et al. | |
| 6,147,452 A | 11/2000 | Kunhardt et al. | |
| 6,245,126 B1 | 6/2001 | Feldman et al. | |
| 6,451,252 B1 * | 9/2002 | Ruan et al. | 422/22 |
| 6,607,672 B2 * | 8/2003 | Koslow et al. | 210/748.12 |
| 6,623,544 B1 | 9/2003 | Kaura | |
| 6,673,137 B1 | 1/2004 | Wen | |
| 6,679,068 B1 | 1/2004 | Guzorek | |
| 6,809,326 B2 | 10/2004 | Disabito et al. | |
| 6,923,890 B2 | 8/2005 | Ricatto et al. | |
| 7,029,636 B2 | 4/2006 | Ricatto et al. | |
| 7,098,420 B2 | 8/2006 | Crowe et al. | |
| 7,658,891 B1 * | 2/2010 | Barnes | 422/186.03 |
| 2001/0032544 A1 | 10/2001 | Taylor et al. | |
| 2002/0094298 A1 | 7/2002 | Monagan | |
| 2003/0106788 A1 | 6/2003 | Babko-Malyi | |
| 2003/0132100 A1 | 7/2003 | Crowe et al. | |
| 2003/0183503 A1 | 10/2003 | Fujii | |
| 2004/0050684 A1 | 3/2004 | Babko-Malyi et al. | |
| 2004/0146437 A1 | 7/2004 | Arts et al. | |
| 2004/0184972 A1 | 9/2004 | Kelly et al. | |
| 2004/0265192 A1 | 12/2004 | Hsieh | |
| 2005/0118078 A1 | 6/2005 | Dobbs et al. | |
| 2005/0142047 A1 | 6/2005 | Baik et al. | |
| 2005/0207950 A1 | 9/2005 | Schroder | |
| 2006/0054821 A1 * | 3/2006 | Salvermoser et al. | 250/325 |
| 2006/0127288 A1 | 6/2006 | Hay et al. | |
| 2006/0130498 A1 * | 6/2006 | Joshi et al. | 62/127 |
| 2006/0153749 A1 | 7/2006 | Schroder | |
| 2007/0041882 A1 | 2/2007 | Roseberry et al. | |
| 2007/0137486 A1 | 6/2007 | Bergeron et al. | |

FOREIGN PATENT DOCUMENTS

| | | | | |
|---|---|---|---|---|
| EP | 1175916 A2 | | 1/2002 | |
| EP | 1293216 A1 | | 3/2003 | |
| GB | 2415774 A | | 1/2006 | |
| JP | 11206316 A | * | 8/1999 | A23B 7/144 |

OTHER PUBLICATIONS

Extended European Search Report, Supplementary European Search Report, and European Search Opinion for International Application No. PCT/US2007/014536, Aug. 22, 2011, 8 pages.

Official Search Report and Written Opinion of the PCT in counterpart foreign Application No. PCT/US2007/014536; filed Jun. 22, 2007.

Abatement Technologies, "CAP50 & CAP100 Series Central Air Purifiers a Cost-Effective Solution to Whole House Air Purification", from http://www.abatement.com/residential/cap_50_100.htm, visited Dec. 22, 2006 (4 pages).

Abatement Technologies, "CAP600 & CAP1200 Series Central Air Purifiers the Ultimate in Whole House Air Purification", from http://www.abatement.com/residential/cap_600_1200.htm, visited Dec. 22, 2006 (6 pages).

Biozone Advanced Technologies, "Biozone Air Purifiers Methods & Technologies", from http://www.air-purifier.org/airpurificationmethods.html, visited Jan. 22, 2007 (6 pages).

Air-Zone, "Air-Zone patented ozone elements VS. 'old style' mica ozone plates", from http://www.air-zone.com/plates.html, visited Jan. 19, 2007 (21 pages).

Air-Zone, "How to Purify Air with an Ozone Generator", from http://www.air-zone.com/purifyair.html, visited Dec. 6, 2006 (16 pages).

Air-Zone, "Professional Ozone Generator Air-Zone XT-14000", from http://www.air-zone.come/xt14000.html, visited Jan. 19, 2007 (19 pages).

Peak Pure Air, "Biozone Air Purifier's Purifying Plasma", from http://www.peakpureair.com/biozref.htm, visited Dec. 22, 2006 (6 pages).

Peak Pure Air, "UV Air Purifier Cleaners—Portable room ultraviolet light air purifier or whole house UV light air cleaners. A germicidal IV air cleaner helps kill mold, viruses, and bacteria", from http://www.peakpureair.ultraviolet.htm, visited Dec. 18, 2006 (7 pages).

Peak Pure Air, "HVAC HEPA & UV Air Purifiers—In Duct Partial Bypass Multi Filtration Systems CAP600 Model, CAP 600-UVP, Model CAP 1200-UVP", from http://www.peakpureair.net/atcap600.htm, visited Dec. 18, 2006 (6 pages).

Abatement Technologies, Inc., "Select the Best Central Air Purifier for Each Home & Budget," from http://www.abatement.com/residential/cap_products.htm, visited Dec. 22, 2006 (2 pages).

Abatement Technologies, Inc., "Advanced CAP Technology", from http://www.abatement.com/residential/purificaiton.htm, visited Jan. 16, 2007 (4 pages).

Abatement Technologies, Inc., "CAP500 Series In-Duct UV Lamp Models—Germicidal Air Purification That's Priced to Please and Designed to Perform", from http://www.abatement.com/residential/cap_500.html, visited Dec. 22, 2006 (4 pages).

Biozone Corporation, "Ozone Generators—Ozone Generator Technology", from http://www.biozone.com/ozone_generators.html, visited Jan. 19, 2007 (3 pages).

Peak Pure Air, "Commercial ozone machines—Industrial ozone generator air cleaners—Odor removal and air sanitizer—Deodorizes with powerful ozone", from http://www.peakpureair.net/ozone-generator.htm, visited Jan. 19, 2007 (5 pages).

Peak Pure Air, "Biozone Germicidal Ultraviolet Light, UV Air Cleaner Air Purifiers", from http://www.peakpureair.com/biozone.htm, visited Jan. 19, 2007 (8 pages).

Peak Pure Air, "Biozone Scientific—Air Purification Technology", from http://www.peakpureair.com/biztech.htm, visited Jan. 19, 2007 (5 pages).

Peak Pure Air, "Biozone SafeZone / Guaranteed Safe Ozone Levels!", from http://www.peakpureair.com/biozsafeoz.htm, visited Jan. 19, 2007 (4 pages).

Atmospheric Glow Technologies, Inc., "Engineering Innovative Solutions Using Plasma", from http://www.atmosphericglow.com/technology.html, visited Sep. 22, 2006 (3 pages).

EPA, "Using Non-Thermal Plasma to Control Air Pollutants", EPA-456/R-05-001, Feb. 2005 (21 pages).

Atmospheric Glow Technologies, Inc., "Air Purification", from http://www.atmostphericglow.com/applications/purification2.html, visited Sep. 22, 2006 (6 pages).

Abatement Technologies, Inc., "Company Information", from http://www.environmental-expert.com/technology/abatementtech/abatementtech.htm, visited Jan. 10, 2007 (9 pages).

* cited by examiner

Ozone Level Dependence on NTP Power

Ozone Generation Rate Dependence on Water Vapor

METHOD AND SYSTEM FOR USING AN OZONE GENERATING DEVICE FOR AIR PURIFICATION

CROSS-REFERENCE TO RELATED APPLICATION(S)

This application claims the benefit of PCT Application No. PCT/US2007/014536 filed Jun. 22, 2007, entitled "A METHOD AND SYSTEM FOR USING AN OZONE GENERATING DEVICE FOR AIR PURIFICATION".

BACKGROUND

The present invention relates to an air purification method for a heating, ventilation and air conditioning (HVAC) system. More particularly, the present invention relates to an air purification method that utilizes a plasma device for generating ozone and other radicals configured for removing contaminants from air.

Air purification devices that generate a high-level of ozone have been used to clean contaminated air within a closed space. However, high levels of ozone may be dangerous or deadly to humans and other living beings. Thus, devices that generate high levels of ozone to clean contaminated air may generally be used only when the closed space is unoccupied. In contrast, other types of air purification devices may be designed for operating under lower contamination levels and may not be capable of generating high-levels of ozone. There is a need for an air purification system and method that generates ozone and is able to operate efficiently within various contaminant levels ranging from normal, everyday low levels to much higher levels.

SUMMARY

An air purification system for a heating, ventilation, and air conditioning (HVAC) system includes an ozone generating device that is used to introduce ozone into an air stream flowing through the ozone generating device. The ozone is used to remove contaminants, including volatile organic compounds (VOCs), from the air stream. The purification system includes sensors in various locations within the HVAC system to measure a concentration of constituents in the air. In some embodiments, the constituents may include ozone and VOCs, such as toluene, butene, and propanal. To control an amount of ozone generated, the purification system controls an amount of electrical power to the ozone generating device. To control a concentration of ozone generated, the purification system controls a flow rate of air through the ozone generating device. Electrical power and flow rate are both controlled as a function of the concentration of one or more of the sensed constituents. In some embodiments, the purification system may include a UVC source downstream of the ozone generating device, which is configured to decompose ozone, through photolysis, into oxygen and oxygen radicals.

DETAILED DESCRIPTION

A system and method is described herein for using an ozone generating device for air purification. In an exemplary embodiment, the ozone generating device is a non-thermal plasma device, which is configured to produce short-lived and long-lived radicals that may react with contaminants, including volatile organic compounds (VOCs), and remove the contaminants from the air. The plasma device also generates ozone, which is highly effective at purifying air, but presents a safety risk above a given concentration. Sensors may be used to measure a level of VOCs and/or ozone in the air. The plasma device may then be controlled as a function of the sensed concentrations of VOCs and/or ozone. Controlling power to the plasma device controls an amount of ozone generated. Controlling a flow rate of air through the plasma device controls a concentration of ozone in the air stream.

By varying ozone output, the air purification method described herein may be used under a wide range of contaminant levels. Moreover, the method is further designed to accommodate higher contaminant levels, through an ability to easily control whether ozone is contained within the duct work of the building or introduced into all spaces of the building, or a portion of spaces within the building. As such, the system and method described herein may be used in a scenario in which there is a purposeful introduction of contaminants into a space.

Figure 1:
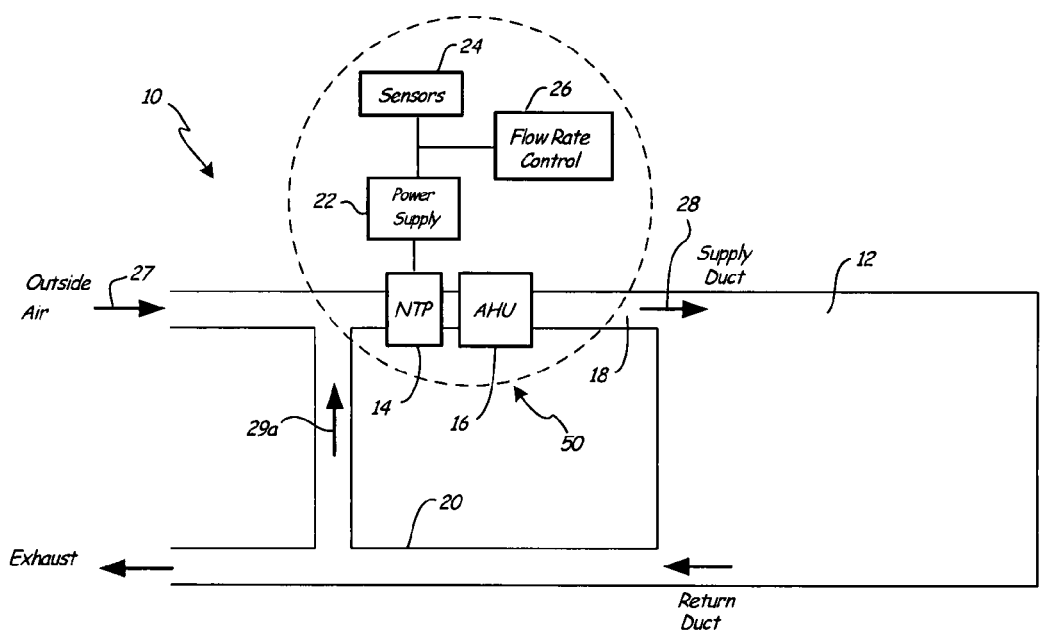
FIG. 1 is a schematic of an air handling system that includes an ozone generating device inside a duct of the system. In the exemplary embodiments shown in FIGS. 1-7, the ozone generating device is a non-thermal plasma device.

The air purification system and method may be incorporated into an air handling system for a building. FIG. 1 is a schematic of heating, ventilation and air conditioning (HVAC) system 10 for space 12. Space 12 may be an inside of any type of building (for example, a hospital) or an enclosed part of a building. In other embodiments, space 12 may be an enclosed space within a vehicle or another type of transportation device, such as, for example, a ground-based vehicle, an aircraft, spacecraft or a boat. System 10 includes air purification system 50, and ducts 18 and 20. Air purification system 50 includes ozone generating device 14, air handling unit (AHU) 16, power supply 22, sensors 24, and flow rate control 26. Air handling unit 16 may be used for heating and/or cooling space 12. It is recognized that air handling unit 16 is not required in air purification system 50. In some embodiments, air handling unit 16 may be omitted from system 50; and in other embodiments, air handling unit 16 may be located downstream or upstream of air purification system 50. In the embodiment shown in FIG. 1, ozone generating device 14 is a non-thermal plasma (NTP) device, which is described in further detail below. It is recognized that other devices designed to produce ozone may be substituted for the non-thermal plasma device. NTP device 14 is connected to power supply 22, which delivers electrical power to NTP device 14.

As shown in FIG. 1, outside air 27 enters duct 18 and passes through air purification system 50, which includes passing through NTP device 14 and then passing through AHU 16. Conditioned air 28 then travels through supply duct 18 to space 12. Return duct 20 removes air 29 from space 12, at which point a first portion 29a of air 29 is recycled back through system 10 and a second portion 29b of air 29 is exhausted from system 10. Recycled air 29a passes through NTP device 14 on its way back to space 12. NTP device 14 may include a blower for drawing air stream 27 and 29a into NTP device 14. Alternatively, a blower which is part of AHU 16 may be used to draw air into NTP device 14 and then through AHU 16.

Non-thermal plasma (NTP) device 14 is used to create a plasma of short-lived and long-lived reactive species that may react with volatile organic compounds (VOCs) and other contaminants, and remove the contaminants from the air. The plasma also produces ozone, which is well-suited for attacking VOCs and other contaminants. As shown in FIG. 1, device 14 is placed upstream of air handling unit 16 and is used to purify an air stream that includes outside air 27 and recycled air 29a.

Sensors 24 may be placed in various locations within HVAC system 10 and may be used to measure a concentration of various constituents in the air. For example, sensors 24 may be located within space 12 of FIG. 1 to measure and monitor contaminant levels within space 12. Sensors for measuring VOC levels may also be placed upstream of NTP device 14 to monitor VOC levels in air 27 entering system 10 and/or VOC levels in recycled air 29a. Moreover, sensors may be located within supply duct 18 downstream of NTP device 14 to monitor the effectiveness of NTP device 14 for removing contaminants from the air.

In addition to sensors for monitoring VOCs, sensors 24 may also include sensors for monitoring a level of ozone. For example, if space 12 is occupied by humans during use of NTP device 14, it may be important to place ozone sensors in space 12 to monitor and ensure that the levels of ozone in air stream 28 are at or below a level that is acceptable to humans. In this case, it may be appropriate to mount ozone sensors near an exit of supply duct 18. Inputs from sensors 24 may thus include data from a plurality of sensors in any possible location within HVAC system 10 of FIG. 1.

The capability of air purification system 50 for purifying air is a function in part of controlling power from power supply 22 to NTP device 14 and controlling a flow rate of the air stream passing through NTP device 14 (as represented in FIG. 1 by flow rate control 26). Increasing power supply 22 to NTP device 14 results in NTP device 14 producing more ozone, as described further below (see FIG. 8). More ozone increases the effectiveness of system 50 to remove contaminants from air. If less ozone is needed, supply 22 decreases power to NTP device 14.

Flow rate control 26 is configured to control a concentration of ozone in the air stream exiting NTP device 14. Decreasing a flow rate of air through NTP device 14, at a constant power setting, results in an increase in concentration of ozone in the air stream exiting plasma 60. An increased concentration of ozone results in a greater purification of the air stream. Power supply 22 and/or flow rate control 26 are adjusted as a function of data from sensors 24. As explained above, the data from sensors 24 may include, but is not limited to, ozone concentrations and/or VOC concentrations at various points within system 10.

Figure 2:
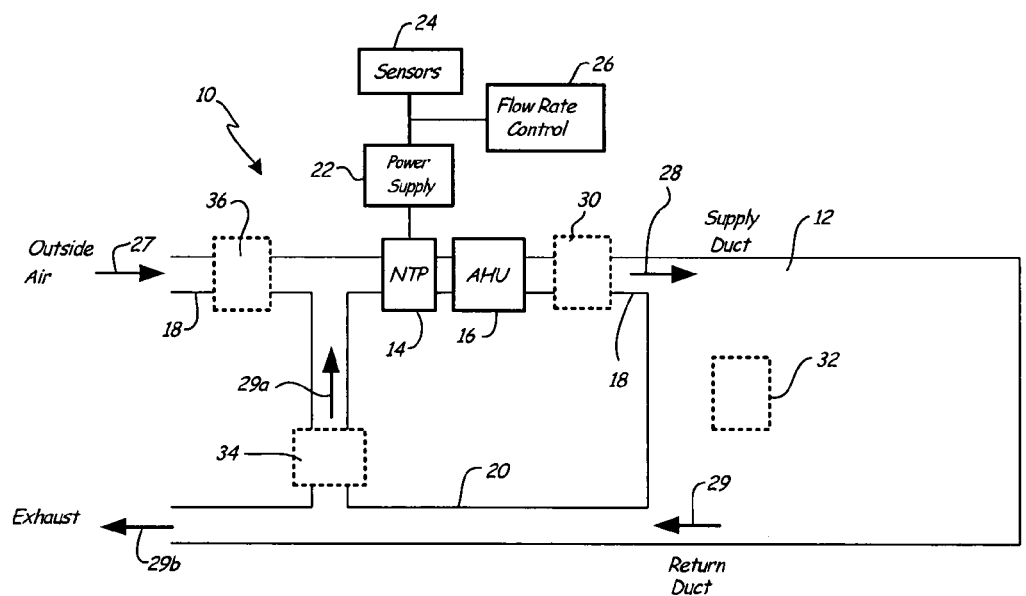
FIG. 2 is a schematic of the air handling system of FIG. 1, which includes alternative or additional locations for the plasma device of FIG. 1.

FIG. 2 is a schematic of air handling system 10 of FIG. 1 illustrating alternative or additional locations for an ozone generating device. As shown in FIG. 2, system 10 includes NTP devices 30, 32, 34, and 36, each of which may include a power supply (not shown) similar to power supply 22. Alternatively, power supply 22 may also be used to deliver power to more than one NTP device.

NTP device 30, as shown in FIG. 2, is placed downstream of AHU 16. In that case, NTP device 30 may likely be used as an alternative to NTP device 14. Instead of receiving outside air 27, as is the case with NTP device 14, NTP device 30 receives a conditioned air stream from AHU 16. Thus, in some cases, the air stream entering NTP device 30 may be at a lower humidity, as compared to outside air 27. In some cases, the NTP device may operate more efficiently if air entering the NTP device contains less humidity.

NTP device 32 is placed within space 12 and, as such, may operate as a stand alone unit. In that case, NTP device 32 may include its own blower. In some embodiments of system 10, NTP device 32 may be used in combination with NTP device 14. NTP device 14 may be used to remove contaminants from outside air 27 and recycled air 29a, which is then delivered to space 12 as clean air 28 through duct 18. NTP device 32 may be used to remove contaminants from air contained with space 12. The combination of NTP devices 14 and 32 facilitates a faster purification of the air contained within system 10.

NTP device 34 is shown inside return duct 20 at a position where exhaust air 29b has already been removed to outside, and recycled air 29a is being returned to supply duct 18. NTP device 34 may be used, similarly to NTP device 32, to remove contaminants from air coming from space 12. In those cases in which it is known that outside air 27 is essentially clean and does not need to be purified, then NTP device 34 may be used instead of NTP device 14. In that case, a lower flow rate may be used, since only recycled air 29a is passing through device 34. As stated above, a lower flow rate of air through the plasma device results, in some cases, in a higher efficiency of the plasma device due, in part, to the higher concentration of ozone in the air stream exiting the plasma device.

Finally, NTP device 36 is shown in FIG. 2 near an entrance to duct 18. NTP device 36 may be used alone or in combination with one of the other NTP devices of FIG. 2 when it is known that outside air 27 contains a high level of contaminants. In that case, recycled air 29a from space 12 does not pass through NTP device 36.

FIG. 2 illustrates that a single NTP device or multiple NTP devices may be used within system 10. It is recognized that multiple NTP devices may provide increased purification of air circulating through space 12; however, in some situations, it may not be cost effective to operate more than one NTP device within system 10. As shown in FIG. 2, an NTP device may be located within the duct work of system 10 or as a stand-alone unit within space 12. The NTP devices that are shown in the duct work in FIGS. 1 and 2 may be mounted inside the duct work as a semi-permanent fixture, or they may be portable units that are easily added, moved around, or removed from the ducts, as needed.

Figure 3:
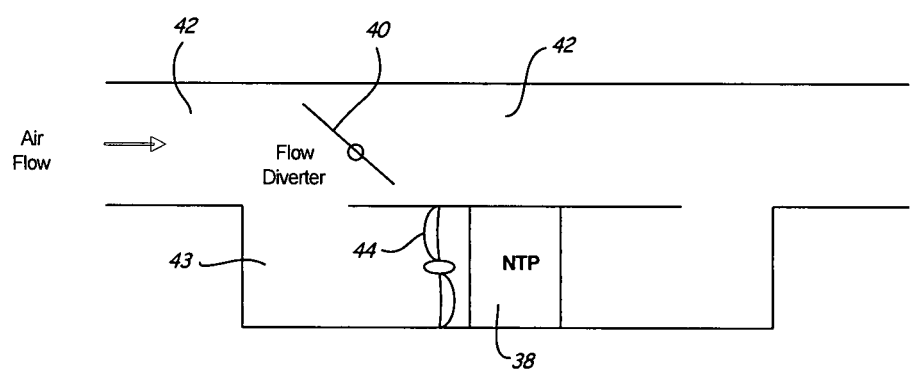
FIG. 3 is a schematic of an alternative design of the air handling system in which the plasma device is located in a duct by-pass.

FIG. 3 illustrates an alternative embodiment of system 10 in which NTP device 38 is used in a duct by-pass configuration. As shown in FIG. 3, flow diverter 40 may be used to direct a portion of air flowing through duct 42 into duct by-pass 43. Air going through by-pass 43 then passes through NTP device 38. As shown in FIG. 3, NTP device 38 includes blower 44.

The embodiment shown in FIG. 3 may be used in a scenario where it is not necessary to purify all of the air passing through duct 42. Moreover, it is recognized that flow diverter 40 may be modified such that more or less air passes through by-pass duct 43. FIG. 3 further illustrates that the ozone generating device may be configured in a number of different ways within an HVAC system.

Figure 4:
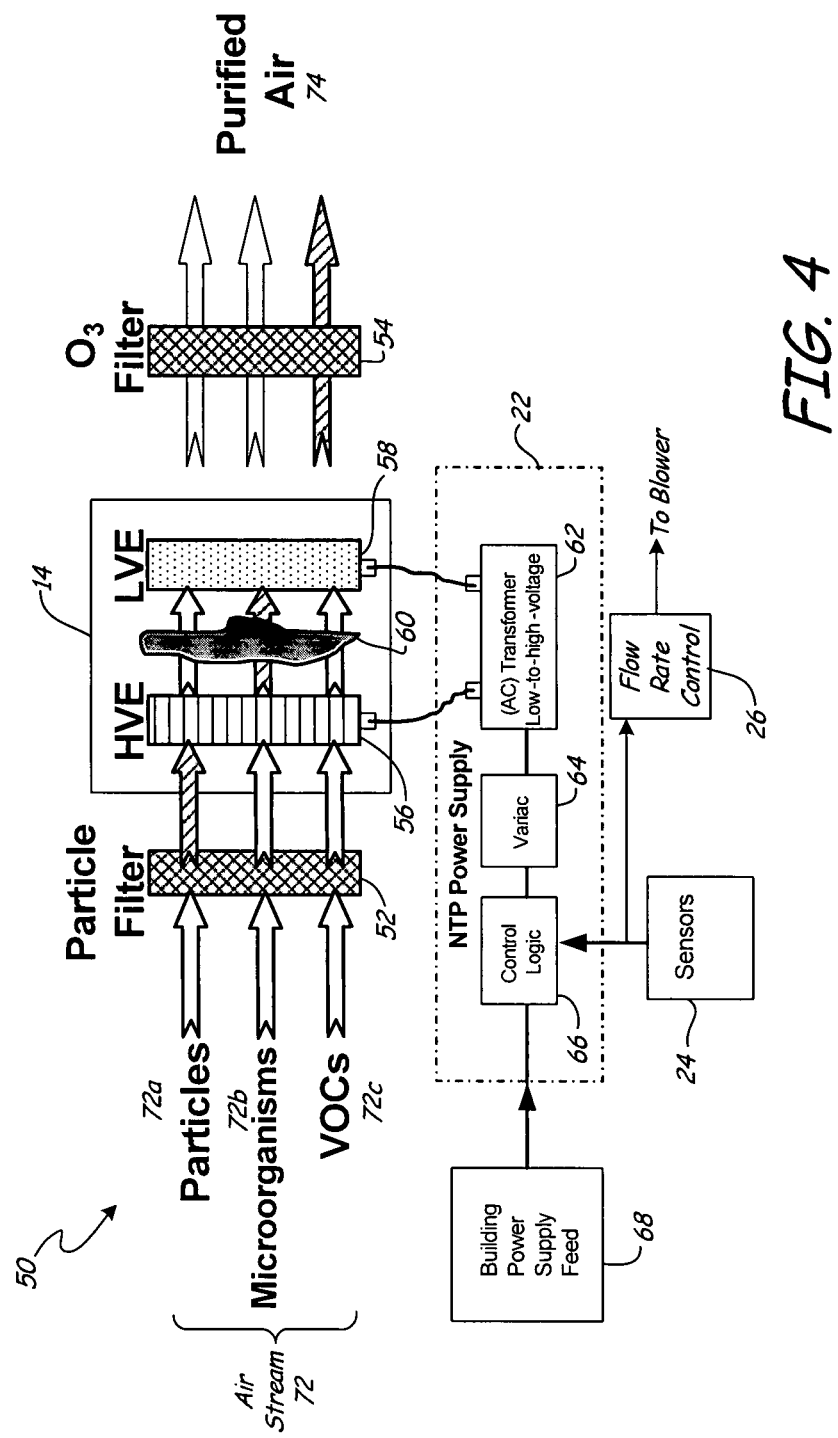
FIG. 4 is a schematic of an air purification system, including the plasma device of FIG. 1, for use during typical or normal contaminant levels.

FIG. 4 is a schematic of air purification system 50 of FIG. 1, which includes non-thermal plasma (NTP) device 14, power supply 22, sensors 24, flow rate control 26, particle filter 52, ozone filter 54, building power supply feed 68, inlet air stream 72, and outlet air stream 74. As explained in more detail blow, NTP device 14 includes a high voltage electrode (HVE) 56 and a low voltage electrode (LVE) 58, which results in formation of plasma 60. Power supply 22 includes alternating current (AC) transformer 62, variac 64, and control logic 66. As shown in FIG. 4, air handling unit (AHU) 16 of system 50 (see FIG. 1) is not shown in FIG. 4 for clarity. It is recognized that system 50 may operate with or without AHU 16. In the embodiment shown in FIG. 4, air purification system 50 is designed for use during typical or normal contaminant levels, as described in more detail below.

Non-thermal plasma (NTP) device 14 uses high voltage electrode (HVE) 56 and low voltage electrode (LVE) 58 to create an electric field, as discussed in further detail below. Plasma 60 is formed between HVE 56 and LVE 58. Plasma 60 is a highly ionized gas composed of ions, electrons, and neutral particles. In the exemplary embodiment of FIG. 4, plasma 60 is characterized as a non-thermal plasma based upon an amount of energy used to create plasma 60. Less energy is required for a non-thermal plasma, as compared to a thermal plasma, and the electrons in the non-thermal plasma are preferentially excited to a high energy. Thus, the mean electron energy in a non-thermal plasma is much greater than that of surrounding bulk-gas molecules. The excited electrons collide with other gas molecules, resulting in radicals.

In the embodiment shown in FIG. 4, non-thermal plasma device 14 is a dielectric barrier discharge device. An example of a representative device is disclosed in United States Patent Application Pub. No. US 2003/0106788, published on Jun. 12, 2003. In one example, the device includes at least one grid and each grid is a series of high voltage electrodes running parallel to one another, and a series of low voltage electrodes running parallel to one another and perpendicular to the high voltage electrodes. The plasma forms in an area where the high voltage electrodes and low voltage electrodes cross one another. Multiple grids may be used in series to increase an amount of ozone generated. Other types of devices that may be used for generating a plasma include, but are not limited to, corona discharge devices and spark discharge devices.

Plasma 60 results in a plurality of electrons, short-lived reactive species, long-lived reactive species, other ions, and ozone. The short-lived and long-lived reactive species are configured for reacting with contaminants in an air stream that passes through plasma 60. The short lived radicals, which may include e-(1-5 eV), $O(^3P)$, $O(^1D)$, $O_2(a)$, $O_2(b)$, $O_2(A)$, $O_2(v)$, $OH^*$, $O_3^*$, $N(^4S)$, and $N_2(A)$, generally exist within a limited area located between HVE 56 and LVE 58. On the other hand, the long-lived radicals, which may include NO, $NO_2$, $NO_3$, $N_2O_5$, and $N_2O$, may migrate outside of an area where plasma 60 exists. Similar to the long-lived radicals, ozone ($O_3$) will survive for a substantial period of time (up to several hours) and thus may migrate downstream of plasma 60. As described in detail below, the generation of ozone by plasma 60 is of particular interest since ozone is highly effective at removing contaminants from the air. Moreover, ozone may be decomposed into oxygen and an oxygen radical, which is also highly effective at attacking contaminants.

FIG. 4 illustrates that inlet air stream 72 passes through NTP device 14 and includes particles 72a, microorganisms 72b, and volatile organic compounds (VOCs) 72c. Common VOCs include, but are not limited to, propanal, butene, toluene, and formaldehyde. Before entering device 14, air stream 72 first passes through particle filter 52 which traps particles 72a, thus eliminating particles 72a from air stream 72 (as indicated by the arrow for particles 72a changing from white to a shaded arrow). Microorganisms 72b and VOCs 72c, for the most part, pass through particle filter 52. Next, air stream 72 passes through plasma 60 formed between HVE 56 and LVE 58. Generally speaking, microorganisms 72b are eliminated within plasma 60. (Similar to particles 72a, the arrow for microorganisms 72b changes from white to a shaded arrow, when the majority of microorganisms 72b are removed in an area around plasma 60.) It is recognized that a portion of microorganisms 72b may make it through plasma 60 without reacting with one of the short-lived radicals. However, the remaining microorganisms 72b may be attacked by long-lived radicals and ozone that are able to survive outside of an area between HVE 56 and LVE 58.

A portion of VOCs 72c may be removed by short-lived radicals residing in plasma 60 between HVE 56 and LVE 58. However, a majority of VOCs 72c are likely removed from air stream 72 when they react with one of the long-lived radicals or ozone. Removal of VOCs 72c thus may occur downstream of plasma 60.

As shown in FIG. 4, air purification system 50 includes ozone filter 54 located downstream of HVE 56 and LVE 58. Because ozone generated by plasma 60 is able to survive longer than some of the other reactive species within plasma 60, ozone filter 54 may be used to remove any remaining ozone from air stream 72. Ozone filter 54 may be formed of activated carbon or a catalyst such as manganese oxide. Air stream 74 exiting system 50 is a purified air stream in which particles, microorganisms and VOCs have essentially been removed. Moreover, air stream 74 is essentially free of ozone, and thus, may be supplied to an occupied space, such as space 12 of FIG. 1. With inclusion of ozone filter 54 in system 50, purification is essentially limited to air passing through the duct work. (This is compared to other embodiments in which purification also occurs within space 12 of FIG. 1.) Other types of ozone mitigating devices may be substituted for filter 54.

Power supply 22, as shown in FIG. 4, is connected to plasma device 14 in order to supply power to high voltage electrode (HVE) 56. In the exemplary embodiment shown in FIG. 4, power supply 22 includes alternating current AC transformer 62, variac 64, and control logic 66. It is recognized that any power supply that provides low frequency AC and variable voltage may be used in system 50. In the exemplary embodiment of system 50 of FIG. 4, AC transformer 62 cycles between a positive cycle and a negative cycle, LVE 58 is a grounded electrode, and HVE 56 cycles from a positive voltage to a negative voltage based on cycling of AC transformer 62. Although LVE 58 is shown downstream relative to HVE 56 in FIG. 4, it is recognized that the positions of LVE 58 and HVE 56 may be reversed such that HVE 56 is located downstream relative to LVE 58.

Control logic 66 operates with variac 64 to control an amount of power supplied to AC transformer 62. Inputs to control logic 66 include building power supply feed 68 and signals from sensors 24. Based on these inputs, control logic 66 controls power to transformer 62, using variac 64, in order to control power from power supply 22 to NTP device 14. As explained above, an amount of ozone generated by NTP device 14 is a function of an amount of power from power supply 22. Control logic 66 may be a controller dedicated to power supply 22, in which case control logic 66 may communicate with a main controller of the HVAC system 10. Alternatively, control logic 66 may be part of the main controller of HVAC system 10.

Air purification system 50 also includes flow rate control 26, which adjusts a flow rate of inlet air stream 72 through NTP device 14. Adjustments to the flow rate are a function of data from sensors 24. The flow rate of air stream 72 is controlled in order to control a concentration of ozone in the air stream exiting plasma device 14. As shown in FIG. 4, flow rate control 26 may include output signals that are sent to a blower that controls air flow through NTP device 14. Control logic 66 may be used for flow rate control 26, or a separate controller, such as the main controller of system 10, may also be used for flow rate control 26.

As stated above in reference to FIG. 1, sensors 24 may be placed in essentially any location within HVAC system 10. Sensors 24 may be connected to the controllers of HVAC system 10, including control logic 66, through a wired and/or a wireless connection.

A benefit of NTP device 14 within HVAC system 10 is its ability to purify an air stream over a wide range of contaminant levels. The embodiment of NTP device 14 of FIG. 4 may be used for typical contaminant levels, which may be relatively low. However, NTP device 14 may easily be configured to handle severely increased contaminant levels, as described below.

Figure 5:
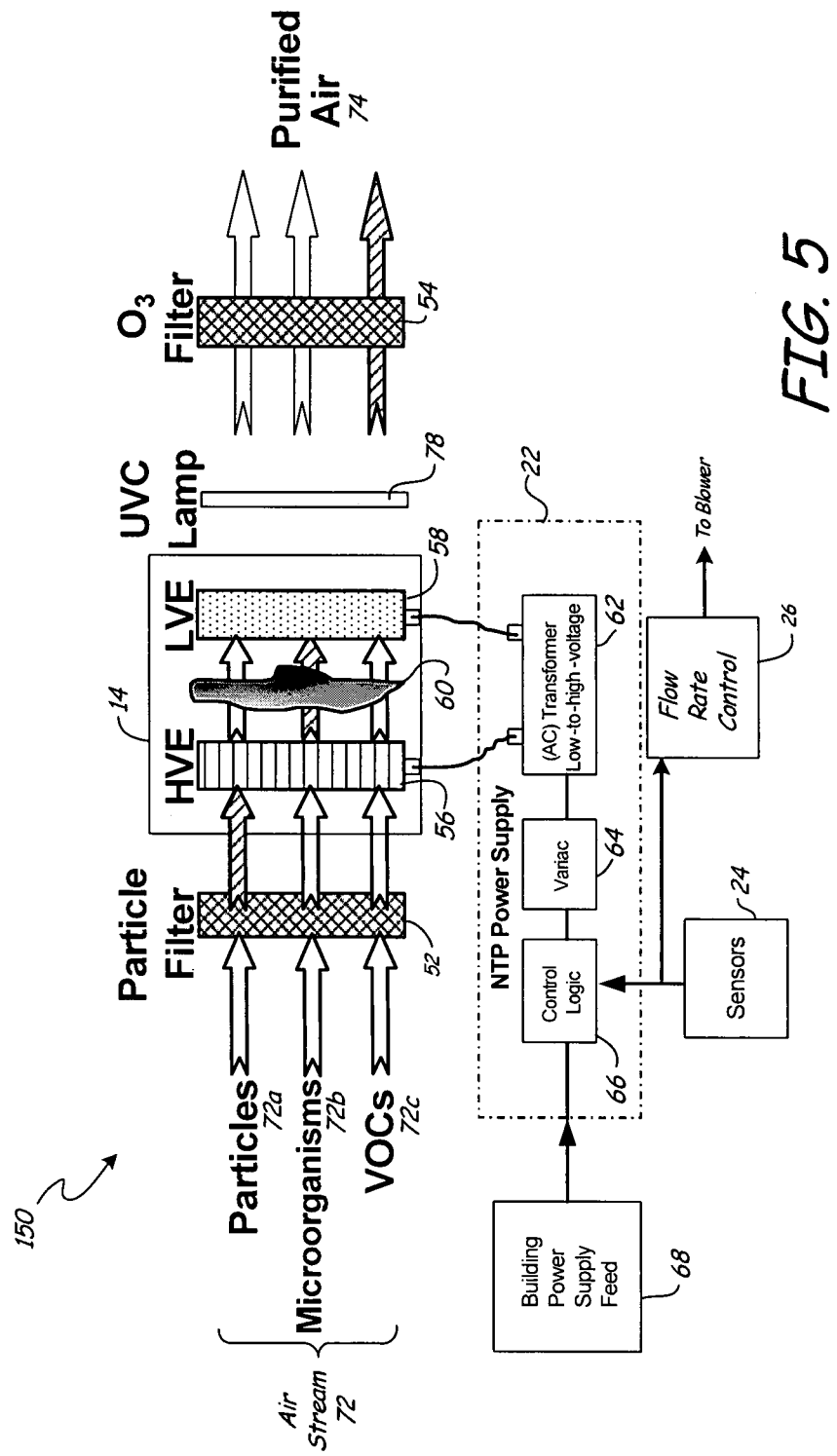
FIG. 5 is an alternative embodiment of the air purification system of FIG. 4 with an addition of a UVC germicidal lamp.

FIG. 5 is a second embodiment of an air purification system that is similar to system 50 of FIG. 4 and may be substituted in system 10 of FIG. 1. Air purification system 150 includes the same components shown in FIG. 4 and described above for system 50; however, air purification system 150 also includes lamp 78, which is located between plasma device 14 and ozone filter 54. Lamp 78 is a germicidal lamp designed to produce ultraviolet light (UVC).

System 150 is similarly configured to system 50 of FIG. 4 for typical contaminant levels. The use of UVC lamp 78 or another UVC source within system 150 may improve purification capabilities of system 150. As described above in FIG. 4, ozone generated within plasma 60 may migrate downstream from plasma device 14. UVC lamp 78 produces UVC photons. When a UVC photon contacts an ozone molecule, photolysis occurs, meaning that the ozone molecule break downs or decomposes into oxygen and an oxygen radical. The oxygen radical, which is extremely reactive, may then react with remaining VOCs and/or microorganisms located between plasma device 14 and ozone filter 54. Because system 150 includes ozone filter 54, air stream 74 exiting system 150 is essentially free of ozone.

In the embodiment shown in FIG. 5, system 150 includes germicidal UVC lamp 78. It is recognized that lamp 78 may be substituted with any type of UVC source, so long as the source is capable of producing light at a wavelength of approximately 254 nanometers. Other UVC sources include, but are not limited to, a light emitting diode (LED) and solar. It is recognized that air purification system 150 may easily be converted into air purification system 50 of FIG. 4 by turning off UVC lamp 78.

As stated above, use of UVC lamp 78 in combination with plasma device 14 facilitates greater effectiveness of the ozone molecules at removing VOCs from an air stream. This is due to the fact that UVC lamp 78 breaks down or decomposes the ozone molecules to form oxygen radicals. The use of filter 54 within system 150 also may be used to increase the effectiveness of system 150 in those embodiments in which UVC lamp 78 illuminates filter 54. In that case, when ozone molecules are adsorbed on filter 54, UVC light from lamp 78 is able to decompose ozone molecules residing on filter 54. This results in oxygen radicals on filter 54, which are then able to react with VOCs that pass through filter 54 or are also adsorbed on filter 54.

Figure 6:
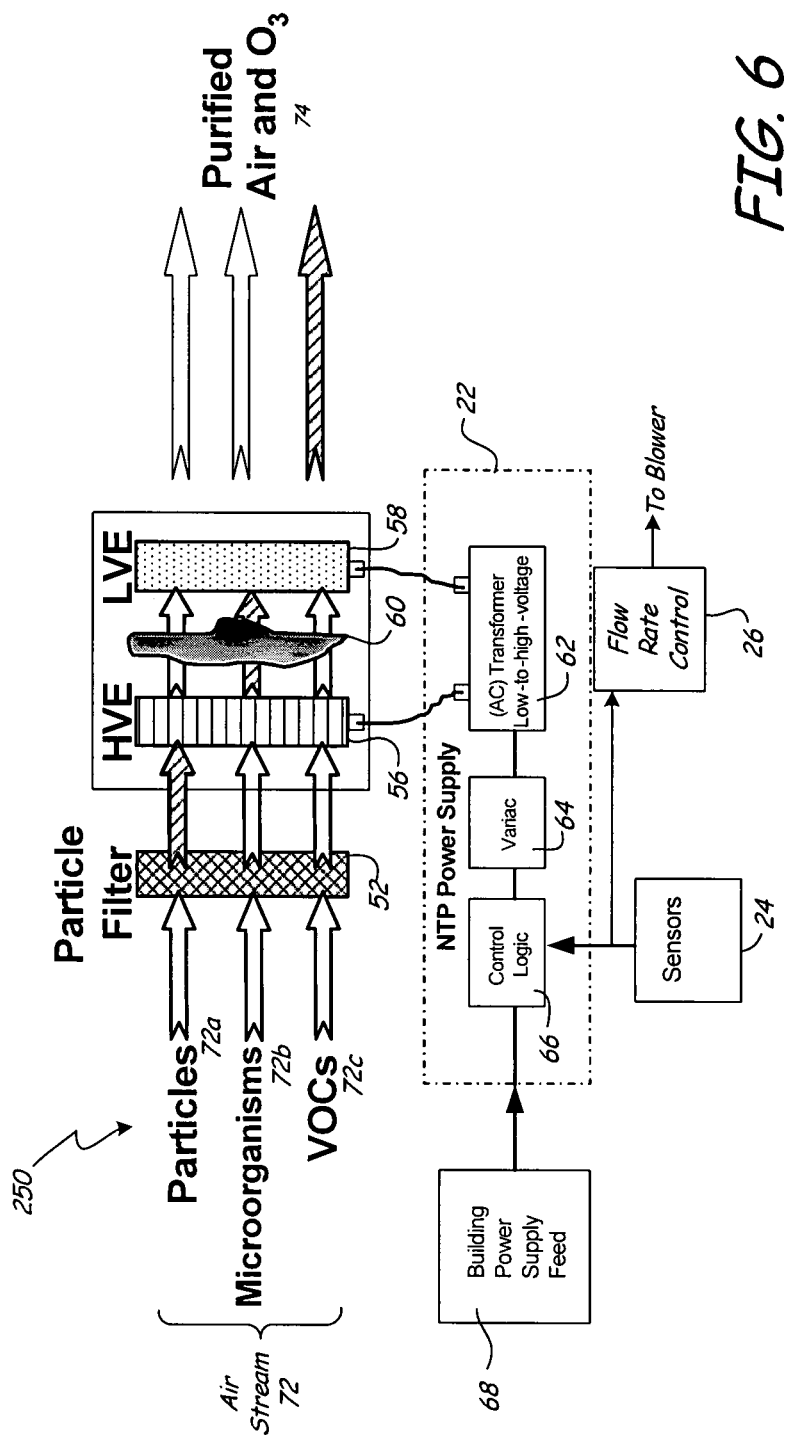
FIGS. 6 and 7 are alternative embodiments of the air purification system of FIG. 4 designed for use during elevated contaminant levels.

FIG. 6 is another embodiment of an air purification system. Air purification system 250 includes the same components shown in FIGS. 4 and 5, except that germicidal lamp 78 and ozone filter 54 are omitted in system 250. In contrast to systems 50 and 150 of FIGS. 4 and 5, respectively, system 250 is designed such that purification occurs not only within the duct work, but also among space 12 of FIG. 1. Because system 250 does not include an ozone filter, ozone molecules generated by plasma 60 are carried with air stream 28, through duct 18, out to space 12 (see FIG. 1). (Air stream 74 of FIG. 6 is equivalent to air stream 28 of FIG. 1.) As shown in FIG. 6, air stream 74 exiting system 250 includes purified air and ozone.

System 250 is thus designed for not only treating air that passes through the duct work, but also for treating air that is contained within space 12 (see FIG. 1). To be effective at removing contaminants from space 12, a concentration of ozone in air stream 274 is preferably above a minimum concentration of 1 part per million (ppm). A typical effective range of ozone for purification is approximately 10-100 ppm. However, the typical human tolerance level for ozone is approximately 0.05 ppm. Therefore, if ozone in air stream 74 is at a concentration above 0.05 ppm, it is important that system 250 be operated when space 12 is unoccupied by humans or other living beings. Sensors 24, as described above, may be used in part for monitoring the concentration of ozone in space 12, and safeguards may be implemented such that notification is given if an ozone concentration in the air rises above 0.05 ppm.

System 250 may be used if there is a sudden increase in contaminant levels within space 12. For example, if there was a purposeful introduction of contaminants, system 250 may be used to flood space 12 with a high concentration of ozone in order to more quickly remove the contaminants from within space 12.

Figure 7:
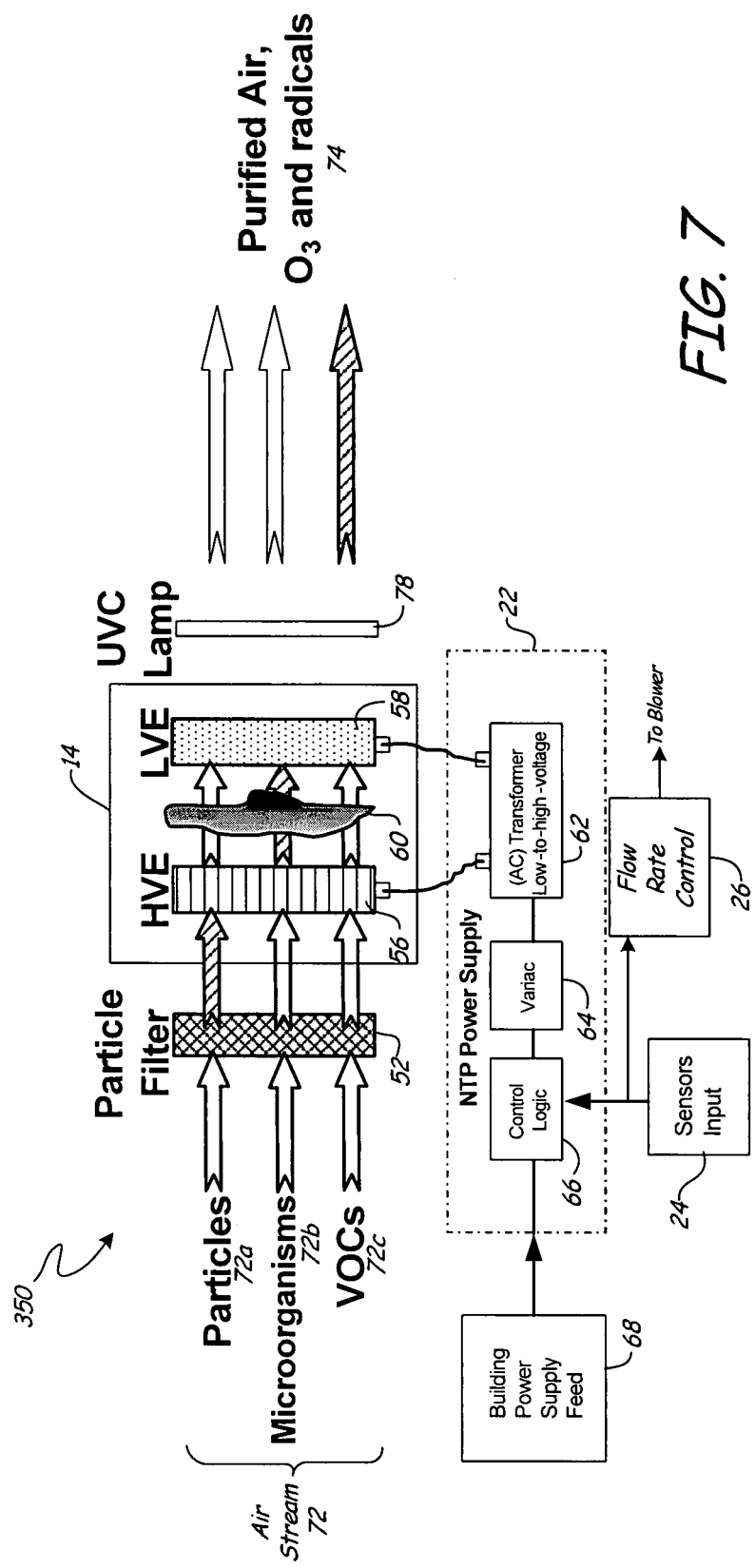

FIG. 7 is yet another embodiment of an air purification system. In contrast to system 250, system 350 includes UVC lamp 78. As described above in reference to FIG. 5, UVC lamp 78 may used within system 350, downstream of plasma 60, to decompose the ozone into oxygen and an oxygen radical. The oxygen radical is well suited for attacking VOCs and/or microorganisms that were not eliminated within plasma 60. As shown in FIG. 7, air stream 74 exiting system 350 contains purified air, ozone and oxygen radicals. Similar to system 250 of FIG. 6, system 350 is configured to purify air contained within space 12, and is preferably used when space 12 is unoccupied.

The combination of a UVC source with a plasma device increases the rate at which contaminants are removed from the air. As an alternative to placing UVC lamp 78 within duct 18 of FIG. 1, a UVC lamp or other UVC source may be located within space 12. In that case, the UVC source breaks down the ozone molecules when they enter space 12. In other embodiments, multiple UVC sources may be used to increase the efficiency of the purification system or decrease the time needed to remove contaminants from space 12.

The embodiments shown in FIGS. 6 and 7 are designed for not only removing contaminants from an air stream passing through the duct work system, but also for removing contaminants from space 12 (see FIG. 1). The latter capability is achieved by flooding space 12 with ozone and long-lived reactive species that react with contaminants and microorganisms located in the air in space 12. In order to deliver ozone and other reactive species into space 12, an ozone filter, such as filter 54, or any other type of ozone mitigating device, is excluded from the air purification system. It is recognized that system 50 of FIG. 4, which is designed to essentially limit contaminant removal to the duct work, may easily be converted into system 250 of FIG. 6, simply by removing ozone filter 54. During operation of HVAC system 10, if it becomes necessary to flood space 12 with ozone, ozone filter 54 may easily be removed. Similarly, system 150 of FIG. 5, which includes germicidal lamp 78, may easily be converted into system 350 by removing ozone filter 54. Germicidal lamps or other UVC sources may easily be turned on and off, and added or removed from the system as necessary. An advantage of the present invention is its flexibility in accommodating various contaminants levels using essentially one overall design of an air purification system. As stated above, UVC sources may be located in space 12, in addition to or as an alternative to inclusion of UVC sources within the duct work.

Figure 8:
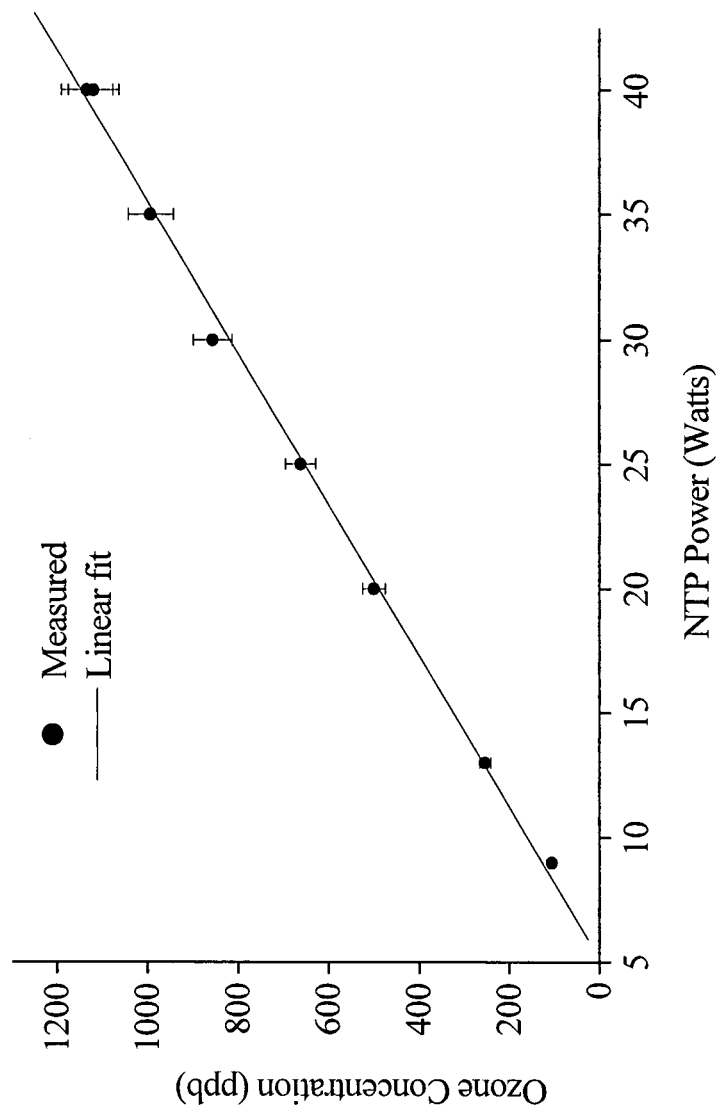
FIG. 8 is a plot of ozone concentration as a function of power supplied to a plasma device.

As stated above, the capabilities of the air purification system described herein are a function, in part, of power to the NTP device. FIG. 8 is a plot of ozone concentration as a function of power supplied to the NTP device. The ozone concentration is measured at a location immediately downstream of the NTP device. FIG. 8 illustrates that an amount of ozone generated by the NTP device is essentially linearly proportional to an amount of power supplied to the NTP device. (It is recognized that ozone may not be generated until a threshold of minimum power is supplied to the NTP device.) Thus, by monitoring and adjusting power to the NTP device, it is possible to control the concentration of ozone generated, based on changing demands within HVAC system 10. It may be desirable to increase an amount of ozone on a periodic, predetermined basis. In addition, it is possible to manually increase power to the NTP device if a sudden increase in contaminants levels is observed, either, for example, in the outside air stream or in space 12. Sensors in various locations within system 10 may be used for this purpose.

Figure 9:
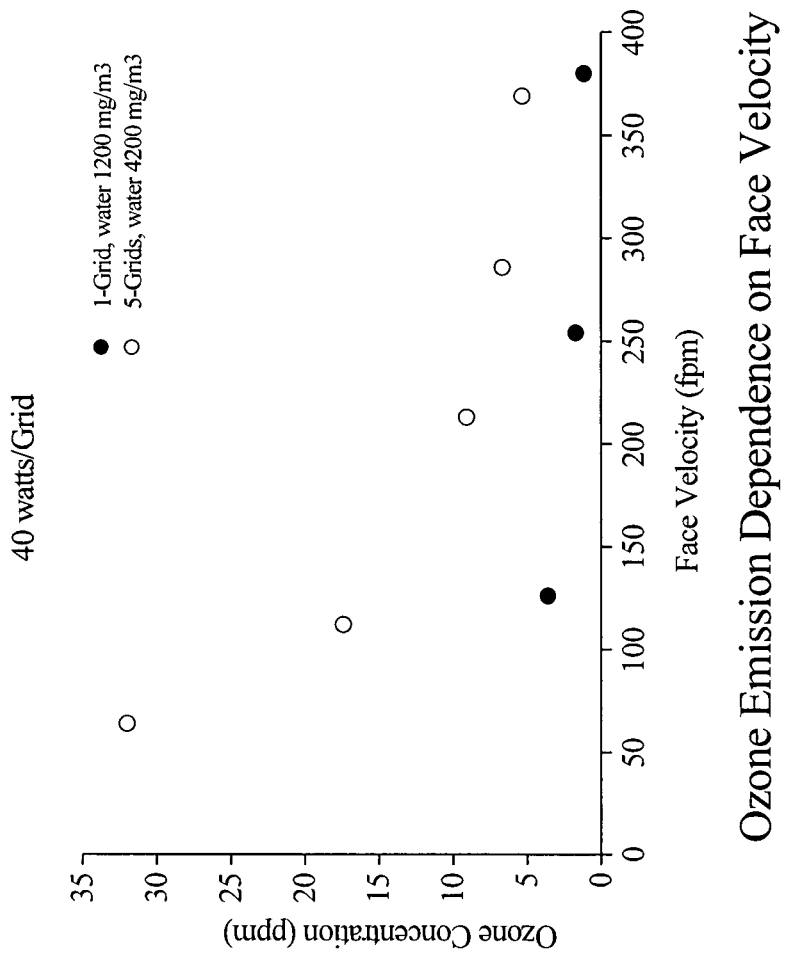
FIG. 9 is a plot of ozone concentration as a function of face velocity of an air stream entering the plasma device.

FIG. 9 is a plot of ozone concentration as a function of face velocity (measured in feet per minute), which is the rate at which air is passing through the NTP device. FIG. 9 shows results for two designs of a plasma device. In the first design, the NTP device is a single grid, whereas in the second design the NTP device includes five grids. Power supplied to NTP device was constant at 40 watts per grid.

FIG. 9 illustrates that a concentration of ozone in the air stream exiting the NTP device decreases as face velocity increases. Because the power supply is constant, essentially the same amount of ozone is being generated. As the flow rate of air increases, more air passes through the device relative to the ozone and the ozone concentration decreases. The dependence of ozone concentration on face velocity or flow rate is more apparent from the NTP device having five grids, as compared to the one-grid NTP device.

Face velocity or flow rate into the ozone generating device may be used as a parameter in operating the air purification system. If it is detected that there is an increase in contaminant levels in an air stream passing through the NTP device, it is feasible for the controller to decrease the face velocity such that a greater concentration of ozone is contained within the air stream exiting the NTP device. As an alternative or in addition to decreasing the face velocity, power to the NTP device may be increased in order to generate a higher volume of ozone.

Figure 10:
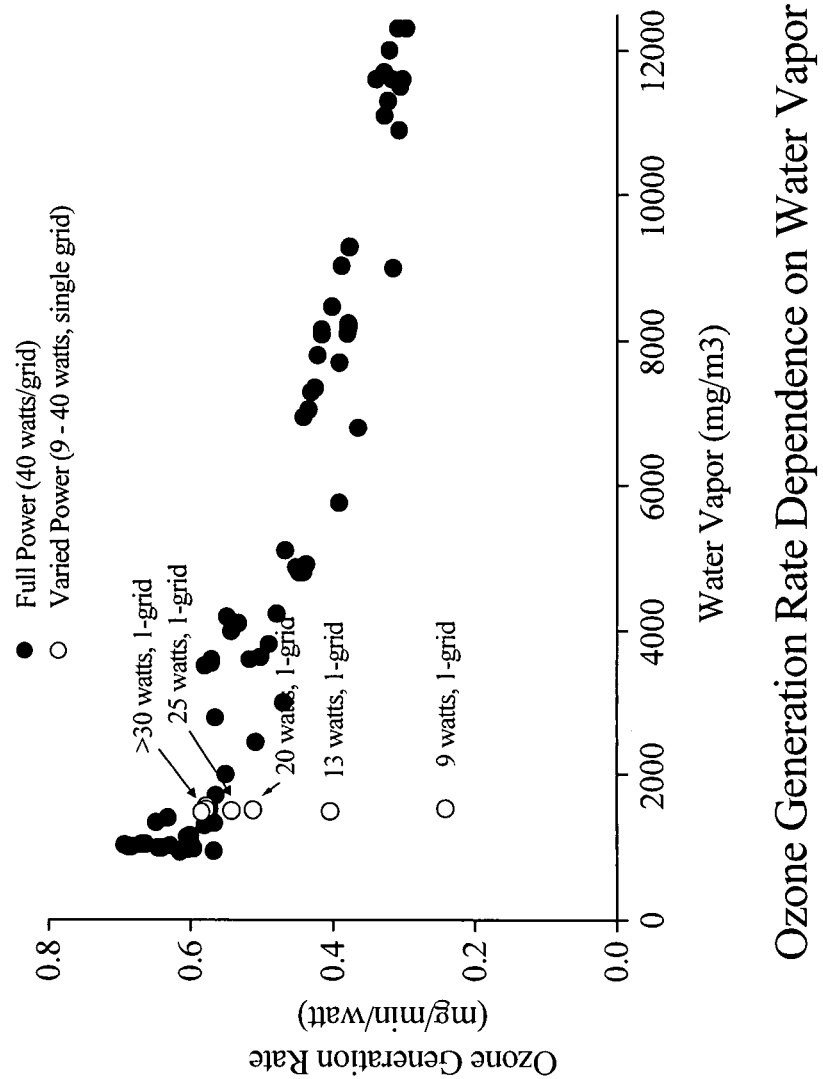
FIG. 10 is a plot of ozone generation rate by the plasma device as a function of the relative humidity of the air stream entering the plasma device.

FIG. 10 is a plot of ozone generation rate by the NTP device, as a function of an amount of water vapor contained with an air stream passing through the NTP device. FIG. 10 illustrates the results for a five-grid NTP device operating at constant power (40 watts per grid) and for a single-grid device operating at varying power levels (9, 13, 20, 25 and 30 watts). The results for the single-grid NTP device confirm the results from FIG. 8, showing that the rate of ozone generation increases as a function of power supplied to the NTP device. The results for the five-grid NTP device illustrate that the ozone generation rate decreases as the amount of water in the air stream increases. Based on these results, in some embodiments, the NTP device may be placed downstream of an air handling unit in the HVAC system such that air entering the NTP device has already been dehumidified. This may be done to increase or maximize an amount of ozone generated by the NTP device. However, the results from FIG. 10 illustrate that, even at higher humidity levels, the NTP device is still able to generate ozone.

Figure 11:
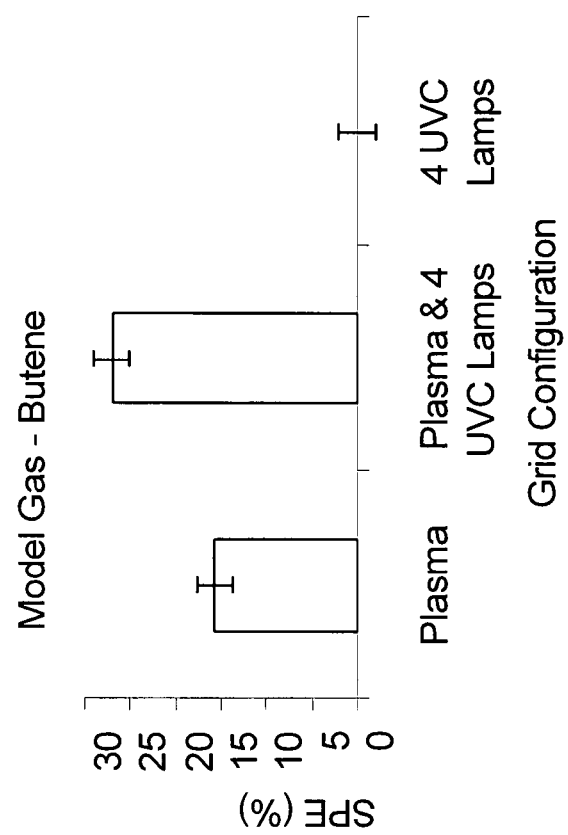

FIG. 11 is a plot of single pass efficiency (SPE) for the NTP device in removing butene from an air stream in three different configurations of an air purification system. Single pass efficiency (SPE) is defined as the difference between the inlet concentration of butene (into the air purification system) and the outlet concentration of butene (exiting the system) divided by the inlet concentration. Higher SPE percentages indicate that a greater amount of butene was removed from the air stream. As shown in FIG. 11, when a plasma device is used in combination with germicidal UVC lamps, the effectiveness of the air purification system at removing butene is greater than when the plasma device is used alone. FIG. 11 further illustrates that the use of germicidal lamps alone is not effective at removing butene from the air stream.

Figure 12:
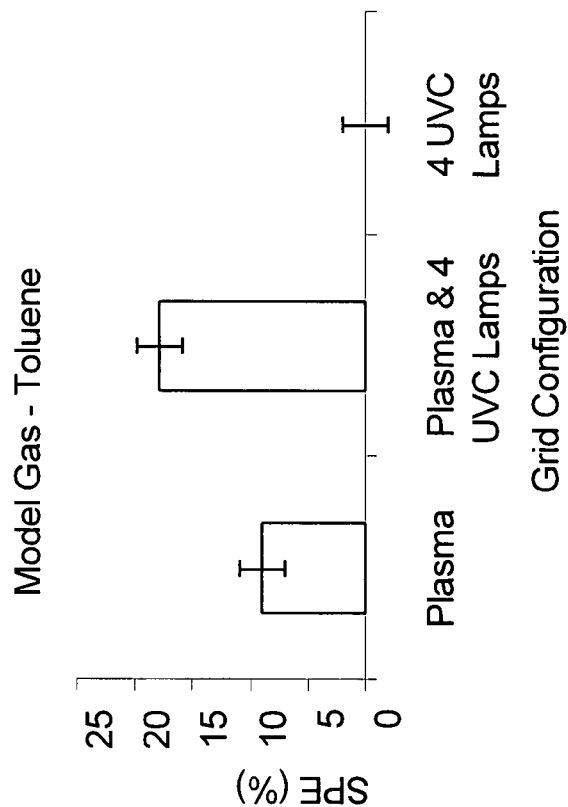
FIGS. 11-14 are plots comparing the purification results of various configurations of an air purification system.

FIG. 12, similar to FIG. 11, is a plot of single pass efficiency (SPE) for the NTP device in removing toluene from an air stream for the three configurations shown in FIG. 11. Consistent with the results from FIG. 11, FIG. 12 illustrates that the use of the plasma device with at least one germicidal lamp is most efficient at removing contaminants, specifically toluene. Use of the plasma device without a germicidal lamp is still effective, but resulted in a lower SPE value. In contrast, the use of four germicidal lamps without a plasma device was not effective at removing toluene from the air.

Figure 13:
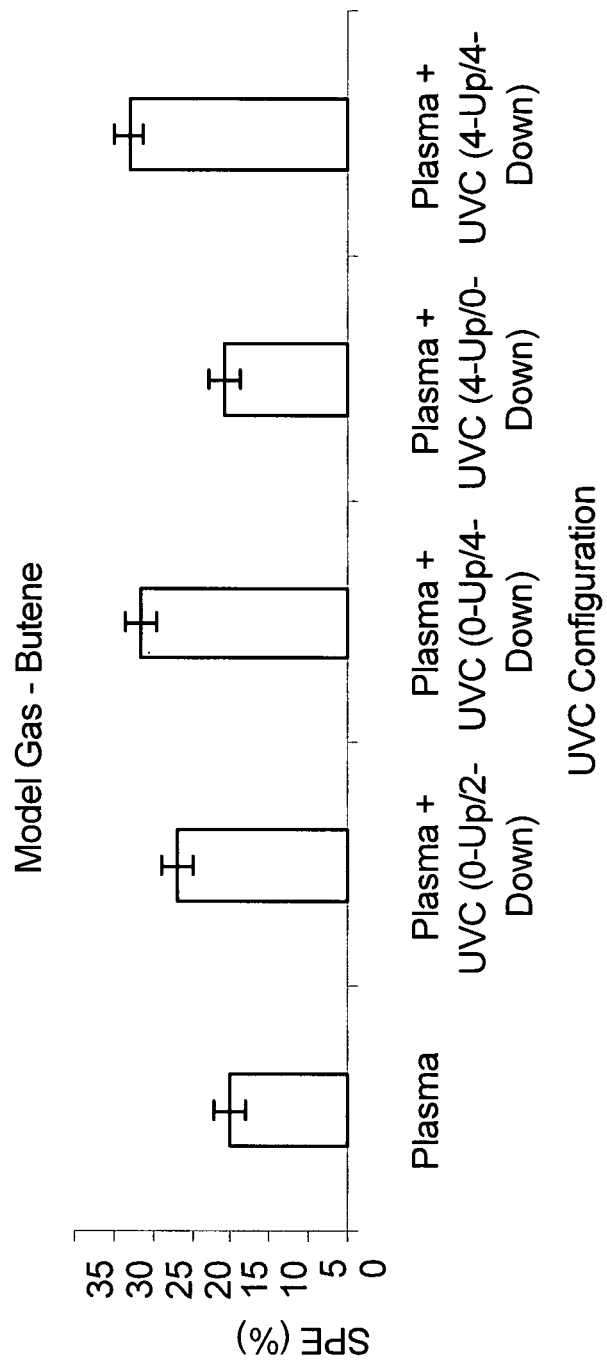

FIG. 13 is similar to both FIGS. 11 and 12, and is a plot of SPE for the NTP device in removing butene from an air stream for five different configurations of an air purification system. FIG. 13 shows the efficiency of a plasma device used by itself compared to if the plasma device is used in combination with either two, four or eight germicidal lamps. As indicated in FIG. 13, the germicidal lamps either were placed upstream and/or downstream of the plasma device. When the plasma device was used alone, the result was an SPE of approximately twenty percent. In the configuration in which the plasma device was used with two germicidal lamps located downstream of the plasma device, SPE was between approximately twenty-five and thirty percent, illustrating that the germicidal lamps increase the purification capabilities of the plasma device. When four germicidal lamps were located downstream of the plasma device, the SPE was over thirty percent.

When all four of the germicidal lamps were located upstream of the plasma device, the SPE was comparable to the results from using the plasma device alone. Similarly when four lamps were placed upstream of the plasma device and four lamps were placed downstream, the SPE results were comparable to the configuration in which only four total lamps were used and all lamps were placed downstream. FIG. 13 shows that little to no benefit results from placing the UVC lamps upstream of the plasma device.

Figure 14:
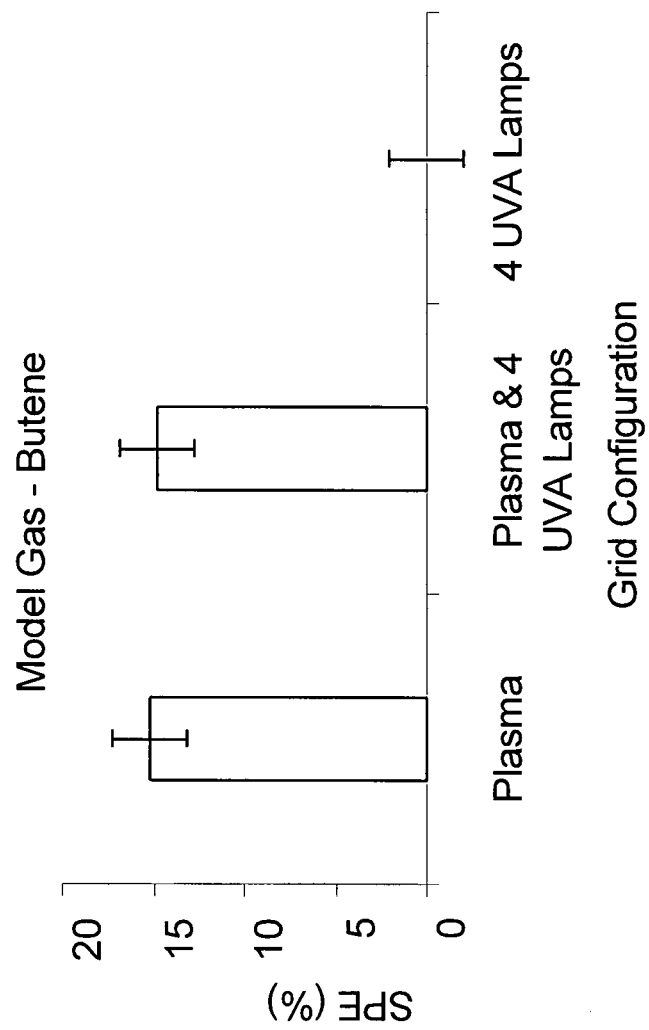

FIG. 14 is a similar plot of SPE for removing butene from an air stream. FIG. 14 illustrates the impact on SPE when UVA lamps, instead of UVC lamps, are used in combination with the plasma device. As shown in FIG. 4, the UVA lamps do not increase the efficiency of removing butene from the air stream. Moreover, UVA lamps when used alone are not effective at removing butene from the air stream.

The plasma device, as described above, is a non-thermal plasma device. In an exemplary embodiment, the plasma device is a dielectric barrier discharge device. It is recognized that other types of devices configured to generate a plasma, such as a thermal plasma device, are within the scope of the present invention. In alternative embodiments, other types of ozone generating devices may be substituted for the plasma device described above.

The ozone generating device described herein may be mounted inside the ducts of an HVAC system and used to purify an air stream passing through the duct system. In that case, purification is limited to occurring within the ducts. Alternatively, the ozone generating device may be used to purify air in an occupied space by flooding the space with ozone. The ozone generating device also may be used for cleaning the actual ducts to remove contaminants that may have built up within the duct work. In some cases it may be difficult to clean out the duct work in a building; however, the method described herein makes it feasible to do this by generating ozone, and other reactive species, and then circulating the ozone through the duct work. This may be used, for example, to prevent or dispose of *legionella* bacteria that may reside in the duct work. In that situation, it is likely that the building connected to the duct work would be evacuated so that high levels of ozone could be flooded through the ducts and the space connected to the duct work. Alternatively, the cleaning of the duct work system may be performed at a time when the building would normally be unoccupied.

The air purification system is described herein for purifying air in a building. It is recognized that the air purification system may be used in other applications, including, but not limited to, transportation devices. The air purification system may be used for purifying air in any type of transportation device, including spacecraft, aircraft, land vehicles, trains, cruise lines and other types of marine craft.

The terminology used herein is for the purpose of description, not limitation. Although the present invention has been described with reference to preferred embodiments, workers skilled in the art will recognize that changes may be made in form and detail without departing from the spirit and scope of the invention.

The invention claimed is:

1. An air purification system configured to remove contaminants from air in an air handling system, the air purification system comprising:
   a power supply providing variable power to an AC transformer;
   an ozone generating device coupled to the power supply, wherein a generation rate of ozone is a function of input power from the power supply, the input power varying in response to the variable power provided to the AC transformer;
   an ozone sensor configured to sense a concentration of ozone in an air stream located downstream of the ozone generating device;
   a contaminant sensor configured to sense a concentration of volatile organic compounds in an air stream; and
   a controller configured to vary input power from the power supply to the ozone generating device to generate ozone at a plurality of non-zero, ozone generation rates, wherein the input power is a function of at least one of the concentration of ozone and the concentration of volatile organic compounds.

2. The air purification system of claim 1 further comprising an air handling unit drawing air through the ozone generating device;
   wherein the controller varies a flow rate of air through the ozone generating device as a function of at least one of the concentration of ozone and the concentration of volatile organic compounds.

3. The air purification system of claim 1 further comprising a UVC source located downstream of the ozone generating device and configured to photolysis ozone into oxygen and an oxygen radical.

4. The air purification system of claim 1 wherein the ozone generating device is a non-thermal plasma device.

5. The air purification system of claim 1 wherein the ozone generating device is inside a duct of the air handling system and the duct is used to deliver air to a closed space.

6. The air purification system of claim 5 wherein the ozone sensor is located in the duct downstream of the ozone generating device or in the closed space.

7. The air purification system of claim 5 wherein the contaminant sensor is located in the closed space or in the duct upstream of the ozone generating device.

8. The air purification system of claim 1 further comprising:
   a filter located downstream of the ozone generating device and configured to capture ozone remaining in the air stream.

9. An air purification system configured to remove contaminants from air in an air handling system, the air purification system comprising;
   an outside air duct supplying a flow of outside air;
   a power supply providing variable power to an AC transformer;
   an ozone generating device coupled to the power supply, wherein a generation rate of ozone is a function of input power from the power supply, the input power varying in response to the variable power provided to the AC transformer;
   an ozone sensor configured to sense a concentration of ozone in an air stream located downstream of the ozone generating device;
   a contaminant sensor configured to sense a concentration of volatile organic compounds in an air stream;
   an air handling unit drawing outside air from the outside air duct through the ozone generating device and to a supply duct for supplying supply air to a space;
   a return duct providing return air from the space, the air handling unit drawing a portion of the return air through the ozone generating device;
a controller configured to (i) vary input power from the power supply to the ozone generating device to generate ozone at a plurality of non-zero, ozone generation rates, wherein the input power is a function of at least one of the concentration of ozone and the concentration of volatile organic compounds (ii) vary a flow rate of air through the ozone generating device as a function of at least one of the concentration of ozone and the concentration of volatile organic compounds.

* * * * *